Inventor:
Michael Maul
BY: [signature]

Inventor:
Michael Maul
By: Michael S. Striker
agt

Aug. 20, 1957 M. MAUL 2,803,403

RECORD CARD CONTROLLED MACHINES

Filed Jan. 14, 1954 3 Sheets-Sheet 3

Inventor:
Michael Maul
BY: [signature]

United States Patent Office
2,803,403
Patented Aug. 20, 1957

2,803,403

RECORD CARD CONTROLLED MACHINES

Michael Maul, Schwabach, near Nurnberg, Germany

Application January 14, 1954, Serial No. 404,061
Claims priority, application Germany January 19, 1953
16 Claims. (Cl. 235—61.7)

Figure 1:
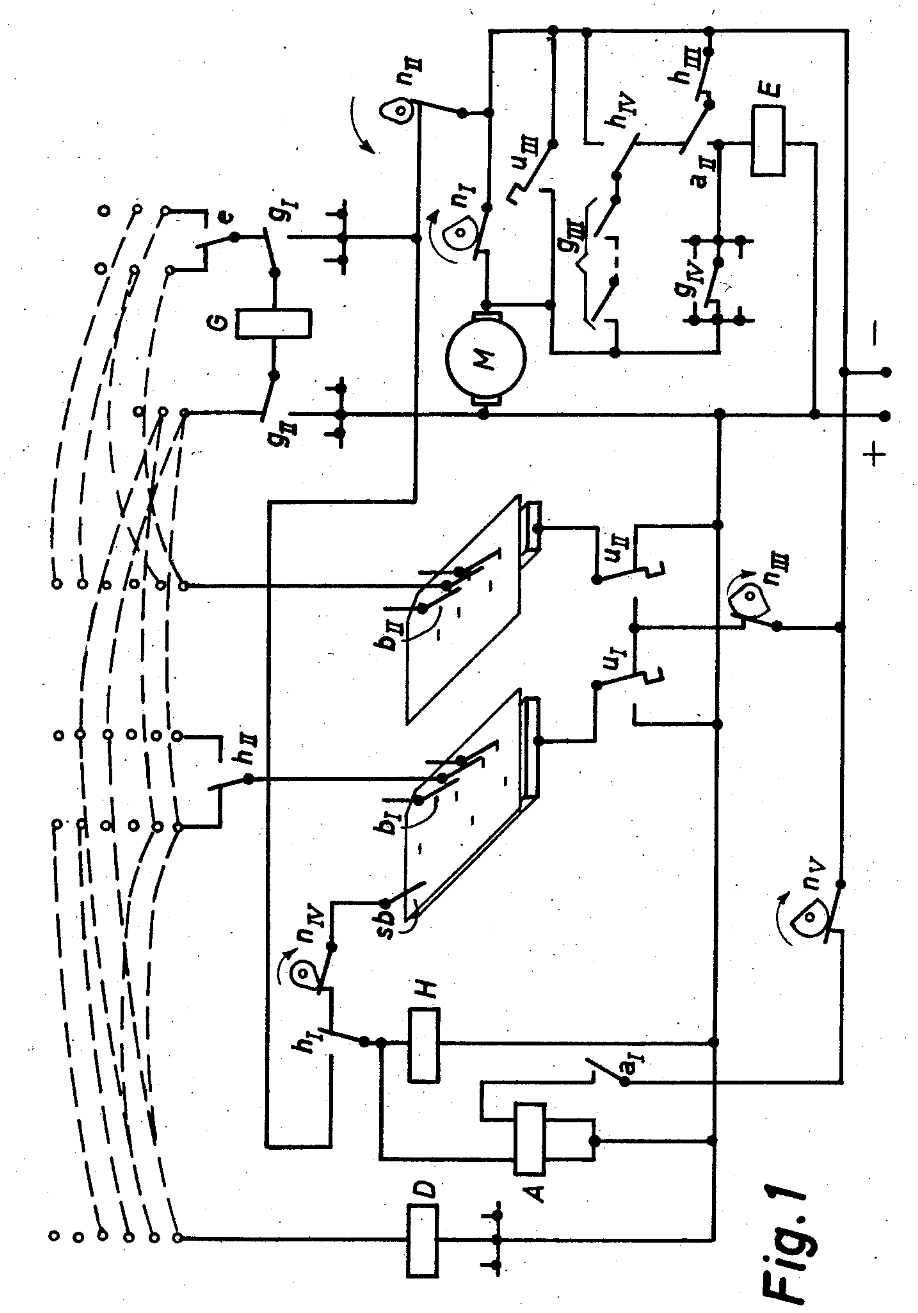

In record card controlled recording machines in which the cards are fed consecutively one by one past analyzing devices it is known to compare the group data of consecutive cards with each other and to govern the machine differentially depending upon the result of the comparison. Such devices are generally called group control devices. On the other hand it is also known to supervise recording machines in a certain manner by a special mark of certain cards, such as for instance by a special hole directing for instance the marked amount into the one or another accumulator. Herein, however, the special mark has no relation to the group control.

The present invention now relates to a record card controlled recording machine wherein the record cards pass consecutively one by one a comparing device which compares the group data of successive cards with each other, said group data being provided in group data fields. Such comparing devices are generally known and in use as group control devices. The essential feature of the present invention now consists therein that under the control of an analyzing device for special marks of certain record cards the group control device is shifted to group data fields of these special cards, said group data fields having upon the record cards a position differing from that of the group data fields of the record cards being not provided with special marks (regular cards). Accordingly, the invention permits to compare the group data fields with each other if said fields are arranged in successive cards in different columns.

The advantage which the invention affords will become particularly obvious in the later on described example of its application in which the regular cards are provided as item cards and the special cards as summary cards, the latter being always placed at the end of a group of item cards. If the data of such items cards and of the summary cards provided between the individual groups of item cards are to be printed consecutively one by one (the summary cards being therein provided with the special mark) it is possible, when applying the invention, that the group data fields in the summary card are placed in the card in a position other than in the item cards. Accordingly, the division of the summary card into fields can be made independently of the field division of the item cards, thus permitting to exploit the summary card as far as possible. A further advantage of the invention consists therein that it is possible to use the special mark or its analyzing device, respectively, also simultaneously (for instance in a table printer) for connecting the analyzing devices for the summary card fields to printing denominations other than during the analysis of the item fields. This permits that upon printing an arbitrary relative setting off of the total data with regard to the printing columns of the items may be effected.

The invention can be used for the various types of group control devices. In a preferred embodiment a known group control device is used the analyzers of which compare each time simultaneously the group data of two consecutive cards by means of two analyzing stations arranged one behind the other in the card feeding path. In such a group control device shifting is effected each time at each of the two sets of analyzers under which there is a special card while during the passage of a regular card the group control remains connected to the analyzers for the group data fields of the regular cards.

Shifting of the group data fields in the two consecutive operating cycles can be effected by a single analyzer for the special mark, said analyzer being associated with the first analyzing station and the analyzing impulse of which remaining stored during two operating cycles. However, in order to attain the shifting according to the invention also a special analyzer for the special mark may be associated with each of the two analyzing stations, each of them supervising the change of the group control device upon the group data fields for the special card and the regular cards.

The invention may be so provided that the analyzing device for the special mark of the special cards and the group control device can be used jointly for a card sequence supervision device checking the relative sequence of the cards with regard to each other. The manner of operation of this supervision device is then described in the instances which will now be explored.

The group control device compares the group data of the card having a special mark with those of the preceding card. Upon disagreement of the group data of these two cards the card sequence supervision device will become operative in the meaning of an error indication. However, the group control device may also compare the group data of the card having a special mark with those of the subsequent card and upon agreement of the group data of these two cards the card sequence supervision device will become operative in the meaning of an error indication. Further on according to the invention the card sequence supervision device will become operative in the meaning of an error indication if the group control device responds due to a group change of the cards without a special mark being present at the same time in one of the cards controlling the group control device.

The application of the invention is of particular advantage in a record card controlled table printer. In the latter the data of the consecutive cards are continuously printed one by one under the control of the card sequence supervision device as long as the supervision device responds in the meaning of a correct-indication. Printing of further cards, is, however, avoided if the above mentioned supervision device responds in the meaning of an error indication. Preferably, in such a table printer the analyzer for the special mark may control at the same time a rearranging device for the operating connections between the analyzers for the perforation columns of the cards and the denominations of the printing mechanism. Thereby it becomes possible to print the data of the card having a special mark in a different columnary arrangement than the remaining cards.

Preferably the device according to the invention is also provided with a manually settable shifting device which permits at will different manners of operation so that the machine may either be used in accordance with the invention or in a manner known per se without applying the invention.

The advantages which the card sequence supervision device according to the invention affords may best be seen if an example of the application is considered wherein the cards having a special mark (for instance a special hole) represent summary cards arranged between the individual groups of item cards, each summary card containing the same group perforation as the associated item cards. If item and summary cards are available, being interpolated in this manner (which card arrangement may for instance be obtained in a summary card punch according to the British Patent No. 674,572), in order to obtain compilations of printed records it is only necessary to pass these cards through a table printer being provided with a printing device and requiring no accumulators at all.

Upon the passage of the cards (groups of item cards and interpolated summary cards having a special hole) it is now important to have the possibility to determine that in the relative sequence of the item and summary cards with regard to each other there is no error at all. This is obtained with the card sequence supervision device according to the invention. In case there is a card wrongly arranged in the stack, said device will respond in the sense of an error indication, preferably in such manner that the machine is stopped but that at least the further printing of the card data is prevented after occurrence of an error.

From the following considerations will be recognized how the card sequence supervision device according to the invention works whereby it has generally been assumed that the marks upon the cards are indicated by perforations. It can, however, readily be seen that the kind of marks is immaterial for the invention proper.

At first it shall be assumed that the summary card lies "proper" that means that it is at the end of the cards of the same group passing the machine. In this instance the machine determines the presence of a summary card hole (which is in this instance a special hole) and at the same time the group control will detect that the group number of the summary card agrees with the group number of the preceding item card. Accordingly, the summary card lies in the proper group and an error indication will not take place. The total is printed under the control of a summary card. In the next operating cycle the machine determines that the item card following the summary card has a group number differing from the summary card. Thereby it is determined that the summary card is at the end of its group of item cards. Accordingly, an error indication will not take place and the machine will continue running for printing of the item cards of the next group.

Now the various error possibilities shall be considered in which the card sequence supervision device will become operative in the meaning of an error indication.

The one error instance is this that there is a summary card between two item card groups, said card being, however, a wrong summary card which means that the group data of this summary card do not agree with the group data of the preceding item card. It is true, the special hole analyzer will then detect a summary card hole but due to the above mentioned disagreement between the group data the card sequence supervision device will respond in the meaning of an error indication. The same circumstances with regard to the presence of a summary card hole and disagreement exist if the wrong summary card is not between the end and the beginning of two different groups of item cards but is somewhere between the item cards of a group to which the summary card does not belong.

If it has been determined that a summary card lies at the proper group of item cards there still remains to be determined whether this proper summary card is also properly placed at the end of the item card group or whether it is somewhere within the group of item cards. In order to determine this latter instance of error the card sequence comparing device compares—as has already been mentioned above—the group data of the summary card with the group data of the subsequent card, and if in this instance there is an agreement (item cards of the same group follow after the summary card) an error indication will take place.

A further error instance exists if a summary card is missing at all between two groups of item cards or if there is a wrong item card within a group of item cards. It is true that in this instance the group control device will detect a group change, since, however, no special hole has been determined in the card preceding the group change an error indication will take place.

A further error instance which may arise consists therein that two summary cards follow one after the other without one or a plurality of item cards being between them. In this instance an error indication will take place.

A preferred embodiment of the invention is diagrammatically shown in the accompanying drawings. It has been assumed therein that a table printer of the indicated kind is concerned which shall be used for the printing of item cards having summary cards interpolated between them. Known devices are therein only symbolically indicated. It has further been presupposed that a single card of a group cannot be considered at the same time as item card and summary card which would be possible in so called "one card groups." If in the machine according to the invention in such a one card group there is no associated summary card present the error will be indicated by the card sequence supervision device. The same occurs if the summary card is present for a group but if the associated single item card is lacking. Accordingly, the invention presupposes that to each existing group there belongs a summary card, even if the group of item cards consists of only a single item card.

The accompanying drawings illustrate:

Fig. 1 the wiring diagram of the machine.

Figure 2:
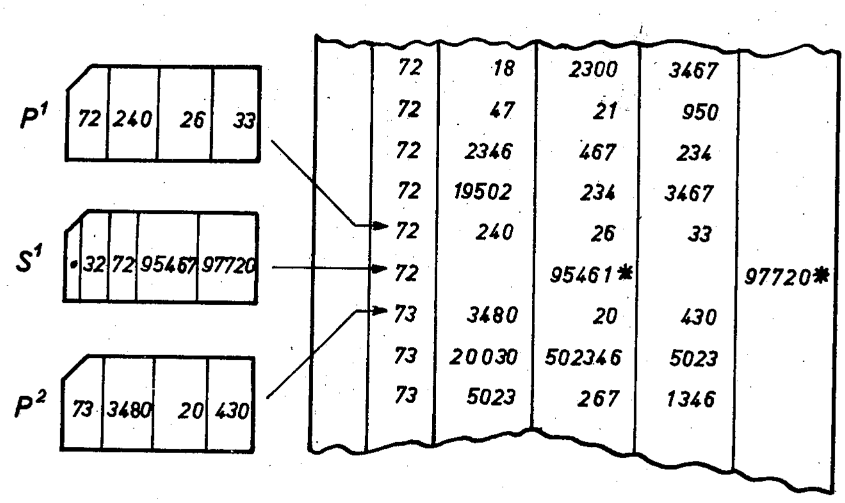

Fig. 2 some record cards as well as a printed list of the card printer. Fig. 2 indicates the coordination of the cards to the various lines of the list.

Figure 3:
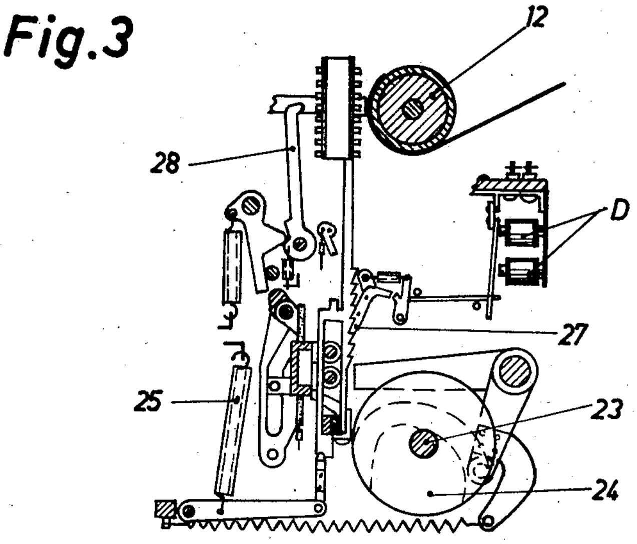

Fig. 3 a section through a known punched card controlled printing device which may be applied in the table printer assumed as an embodiment of the invention.

Figure 4:
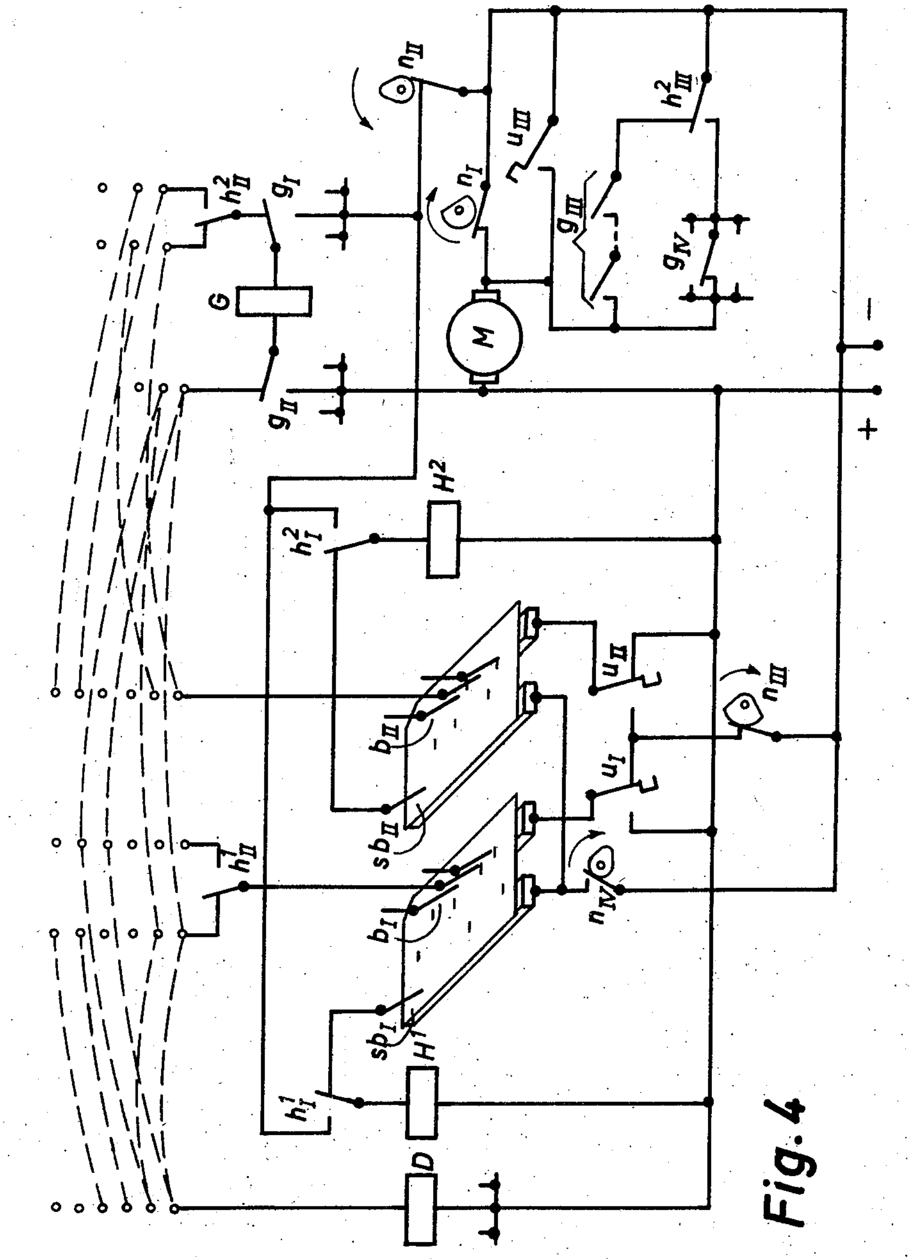

Fig. 4 shows the wiring diagram for a further embodiment of the invention.

In Fig. 2 there are three record cards indicated of which the last card of a preceding item group is designated at $P^1$. $S^1$ is the associated summary card and $P^2$ is the first item card of the subsequent group. For reasons of simplicity and of clarity in the cards not the perforations but the values are indicated which are to be represented by the perforations. There is the same arrangement of perforation fields for all item cards. The perforation fields contain the group numbers and other predetermined designations as well as the amount data which latter are to be computed, as for instance amounts of goods and monetary amounts. It is assumed that the cards pass the analyzing brushes in upward direction, said brushes being provided above the cards.

The field division of the summary cards, however, is differing from that of the item cards. Any direct relation between the field division of the item cards and that of the summary cards is herein not compulsory. It is thus possible that each kind of card may be utilized in the best manner. The free choice of the field division may even be extended to the group number fields so that the group number in the summary card must not be provided in the same perforation columns as in the item cards. The summary cards differ from the item cards by having a special hole at their left hand side (summary card hole) which hole serves for the control of the various operations during the analysis of the item and summary cards.

Beside of the record cards part of a list is illustrated on which the data contained in the record cards are printed by the machine. The reference arrows indicate in which line the values of the cards represented herein may be found. As may be seen by the list the values of the summary cards may be printed as compared with the item cards in such manner that they are either printed in the same column or in a special column in order to emphasize the sum. Therein it is of no importance in which columns of the summary cards the values are provided. The rearranging operation between the analyzing positions and the positions of the printing mechanism is herein effected by the summary hole as will still be described later on. As is shown in the example the number 72 which is to represent a group number, may be provided in the list in the same column as the group numbers of the item cards though it is punched in different columns.

If only item cards shall be printed a hand switch mechanism is provided for this case which mechanism eliminates the control by the summary hole. The group control device is then wired in such manner that the last item card of a group is compared with the subsequent first item card of another group, the machine, however, not being blocked in its further operation upon group change. In this case the group control may be used for other controls as for instance the line by line shifting which shall not be described here in detail.

By means of the current circuit in Fig. 1 the operation of the machine shall now be described in detail.

For reasons of clarity the wiring has only been illustrated for one column or the wiring elements of one column, respectively. If several wiring elements are wired in parallel with each other this is indicated by the distribution connections. The plug board is diagrammatically illustrated by the connection spots and connection wires indicated at the upper margin of the drawing. In the circuit diagram the relays and magnets are indicated by capitals and the contacts which they actuate by the corresponding small letters.

The cards pass under the analyzing brushes $sb$, $b_I$, $b_{II}$. The brush $sb$ serves in this case for the detection of the summary card hole, the brushes $b_I$ serve for the analysis of the value perforations and the transmission of the same to the elements of the printing mechanism. Together with the brushes $b_I$ the brushes $b_{II}$ serve for the group control. With regard to the analyzing brushes $b_I$ the brush $sb$ is arranged in such manner, that it slides over the summary hole before the first hole position of the same card has reached the brushes $b_I$.

If the analyzing brush $b_I$ detects a hole in the card, current will flow from negative through the cam contact $n_{III}$, the contact $u_I$, the brushes $b_I$, the contact $h_{II}$, through the plug board, through the magnet D of the printing mechanism to positive. The latter will be energized and will adjust the printing mechanism according to the perforation. During the analysis of a card the contact $n_{III}$ is closed by its cam and has the task to establish the current circuit to the brushes only as long as the card passes the analyzing brushes.

It shall now first be described how the machine operates if item cards of the same group are analyzed. In this case the brushes $b_I$ and $b_{II}$ will not detect a group change nor will the brush $sb$ find a summary hole. As long as there is no group change, in each operating cycle all group control relays G will respond through the following current circuit: Negative, contacts $n_{III}$, $u_I$, the brush $b_I$, contact $h_{II}$, plug board, contact $g_{II}$ relay G, contacts $g_I$, contacts $e$, plug board, the brush $b_{II}$, contact $u_{II}$ and positive. All group control relays G respond (like group numbers) and will establish for themselves by means of their contacts $g_I$ and $g_{II}$ a holding circuit which will be described more in detail later on. Simultaneously their contacts $g_{III}$ will close. In parallel with the cam contact $n_I$ a current circuit will thus be closed to the motor M through the contacts $h_{III}$, $a_{II}$, $h_{IV}$ and $g_{III}$. Therefore, at the end of the operating cycle if the cam contact $n_I$ opens temporarily the current circuit to the motor M is not interrupted. The machine will therefore continue running without interruption as long as there is no group change.

If a summary card is analyzed and if the brush $sb$ detects a summary card hole in the same, current will flow from negative through the contacts $n_{III}$ and $u_I$, the brush $sb$, the contact $n_{IV}$ which is closed by its cam if there is a card passing under the brush $sb$, through the contact $h_I$, through the relay H and A to positive. The relay H responds and actuates its contacts $h_I$ to $h_{IV}$. By means of the contact $h_I$ the relay H establishes a holding circuit through the cam contact $n_{II}$ so that it remains energized even if the summary card hole has passed the brush $sb$. The current circuit through the relay A and the functions of the latter will be referred to later on. By means of the contacts $h_{II}$ (one of which being of course provided for each analyzing brush) the relay H shifts the brushes $b_I$ to other plugging spots and therewith according to the plugging to other magnets D of the printing mechanism. During this shifting it is also possible that according to the plugging other brushes $b_I$ are shifted to the magnets D of the printing mechanism so that data of other perforation columns are printed in the same column of the list. In addition to the magnets D of the printing mechanism also the group control relays G are plugged to the plugging spots of the brushes $b_I$ which analyze the group perforations, so that upon shifting of the contacts $h_{II}$ in the same way as with magnets D other brushes $b_I$ may operate on the relays. The contact $h_{III}$ is opened and the contact $h_{IV}$ will be shifted. Both contacts have the task to prepare the current circuit for the locking of the machine which takes place if the group control detects that there is no agreement between the two group numbers. Locking of the machine will be referred to once more later on.

After a summary hole has been found in the card, the relay H has responded and the machine has accordingly been shifted, analysis of the summary card by the brushes $b_I$ will begin. Simultaneously therewith the brushes $b_{II}$ analyze the preceding card in order to compare the group number with that of the card being under the brushes $b_I$. Comparison is effected by the group control relays G. If the group perforations are identical in both cards, current will flow through the current circuit which has been described above in connection with the group control to the relays G. The relays G respond and actuate their contacts $g_I$ to $g_{IV}$. The two contacts $g_I$ and $g_{II}$ are shifted, thus establishing a holding circuit for the group control relay G and interrupting the connection to the analyzing brushes. Current will flow from negative through the contacts $n_{II}$, $g_I$, through the relays G, through the contacts $g_{II}$ to positive. Through the shifted contact $h_{IV}$ the contacts $g_{III}$ establish a current circuit to the motor M so that the other paths which are in parallel with this current circuit have not any influence on the operating cycle. The contacts $g_{IV}$ are opened which, however, at this moment has not yet any influence on the operation of the machine since this current circuit is interrupted by the contact $h_{III}$. It may thus be seen that if there is a summary card hole and an agreement of the group numbers of both cards the further operation of the machine is not interrupted.

If, however, the group numbers do not agree, one of the relays G has not responded and has not closed its contact $g_{III}$ either. The current circuit to the motor is therefore interrupted as soon as the cam contact $n_I$ opens so that the motor M and thereby also the machine become stationary for the error indication. The same will occur if the analyzing device detects a group change without a summary card having been analyzed before. In this case interruption of the motor current circuit is also effected through the group control relay contacts $g_{III}$. The difference as compared to the just described current circuits consists therein that the H-relay (since no summary card has been analyzed) has not responded so that the contact $h_{III}$ has been closed while contact $h_{IV}$ has not been shifted. Accordingly, the current circuit to the contacts $g_{III}$ will flow through the contacts $h_{III}$, $a_{II}$, $h_{IV}$ as has already been described above.

After analysis of a summary card and printing of the total a group change will take place in the card sequence if the cards are in the right position. In case this should not occur the summary card is wrongly interpolated which means within that card group having the same group number as the summary card. This error must be indicated by the machine. The control whether after the summary card a group change takes place is effected by the relay A in connection with the group control relay G. As already mentioned above upon analysis of a summary card simultaneously with relay H also relay A is energized. The relay A closes its contact $a_I$ thereby establishing a holding circuit through a second winding and the cam contact $n_V$. In parallel with the cam contact $n_I$ the cam contact $n_V$ is opened. As already mentioned above the cam contact $n_I$ and therewith the cam contact $n_V$ open temporarily before opening of the cam contact $n_{II}$. Accordingly, during the operating cycle which follows the summary card the relay A remains energized. At the end of the summary card cycle the cam contact $n_V$ is temporarily opened; at the same time, however, the cam contact $n_{II}$ is still closed so that the relay A is now energized through the contacts $n_{II}$ and $h_I$. Before the cam contact $n_{II}$ opens the cam contact $n_V$ has again closed so that the relay A will remain energized through the contacts $n_V$ and $a_I$ while the relay H will be deenergized, thus causing its contact $h_I$ to return to its home position. In this way the relay A will not be deenergized before the cam contact $n_V$ will open again at the end of the operating cycle following the summary card cycle. As soon as the relay H is deenergized at the end of a summary card cycle also the contacts $h_{II}$ will return to their home position so that now again the printing mechanism and that side of the group control relays which is connected to the brushes $b_I$ are switched on for the analysis of the item cards.

In the now following operating cycle, due to the energization of relay A and the deenergization of relay H, the contact $h_{III}$ has closed and the contact $a_{II}$ has been shifted so that the relay E is energized thus shifting its contact *e*. In this way the group control relays G are shifted according to the plugging to other brushes $b_{II}$ under which in this operating cycle there is the summary card. Moreover, a circuit through the contacts $h_{III}$ and the contact $a_{II}$ being shifted at this moment, is established to the contacts $g_{IV}$ of the group control relays. However, the circuit to the contacts $g_{III}$ of the group control relays is now interrupted. If in the subsequent analyzing cycle the group control detects a group change one or several group control relays G have not responded and have therefore not opened their contact $g_{IV}$. The current circuit to the motor M is thus maintained, even if the cam contact $n_I$ opens and the machine continues running without being interrupted. If, however, the group numbers of the two analyzed cards are identical all group control relays G have responded and therefore opened their contacts $g_{IV}$. In this way the current circuit to the motor M is interrupted upon opening of the cam contact $n_I$ and the machine becomes stationary for error indication.

A further case of error consists therein that two summary cards are in consecutive order without a group of item cards being between them. This case is also noticed by the machine in that the error indication responds if in two consecutive operating cycles the special hole analyzer determines that there is a special hole. If the first summary card is analyzed the two relays A and H respond as has already been mentioned above. At the end of the operating cycle the relay H is again deenergized while the relay A remains still energized for the next operating cycle. At the beginning of this operating cycle the contact $a_{II}$ has accordingly been shifted. If now in this operating cycle again a summary hole is analyzed the relay H will respond, will open its contact $h_{III}$ and will shift its contact $h_{IV}$. Thereby the contact $h_{III}$ interrupts the current circuit to the motor through contacts $a_{II}$ and $g_{IV}$ as well as through relay E. The contact $h_{IV}$ establishes the current circuit to the motor through the contacts $g_{II}$. By the deenergization of the relay E also its contacts *e* return to their home position, thus disconnecting the group control relays G from the brushes $b_{II}$ which analyze the group number of the summary card so that not all group control relays can respond and that the chain of contacts $g_{III}$ remains interrupted. Therefore upon opening of the contacts $n_I$ the motor and therewith the machine become stationary for error indication.

If in the machine only item cards are to be printed and if the group control shall be used for different controlling operations, as for instance the paper feed mechanism (which shall, however, not be described here in detail) shifting of the contacts $u_I$, $u_{II}$ and closing of the contact $u_{III}$ is done manually. The brushes $b_{II}$ will then operate as value analyzing brushes while the brushes $b_I$ operate as group control brushes in a known manner. Accordingly, not the card preceding the value analysis but the subsequent card is influencing the group control. The contact $u_{III}$ is closed, thus short-circuiting the current circuits for the error indication, which in this case is not necessary since no summary cards occur. It is understood that the plug board has to be plugged according to the rearranging. The magnets of the printing mechanism are no longer to be wired to the brushes $b_I$ but to the brushes $b_{II}$.

By means of Fig. 4 the wiring diagram of a machine shall now be described, said machine being equipped as has already been described above, with one special hole analyzer for each set of analyzers. The arrangement of the wiring diagram is similar to that shown in Fig. 1 which has been already described above. Therefore only wiring elements which differ from those in Fig. 1 shall be described.

Synchronously with the passage of the item cards past the analyzing brushes $b_I$ and $b_{II}$ the cam contact $n_{IV}$ closes temporarily when there is a field for the special hole under the brushes $sb_I$ or $sb_{II}$, respectively. As long as there is no special hole in the cards the item cards are analyzed one after the other and their enterings are transferred to the magnet D of the printing mechanism. Simultaneously therewith controlling of the group numbers as to their agreement is effected through the brushes $b_I$ and $b_{II}$ as well as through the group control relays G in a similar manner as has already been described above.

If a summary card having a summary hole is following the item cards, upon closure of the cam contact $n_{IV}$, an impulse is emitted through the brush $sb^1$ and contact $h^1_I$ through the relay $H^1$. The latter responds and shifts its contacts $h^1_I$ and $h^1_{II}$. By means of contact $h^1_I$ a holding circuit is thus established through the cam contact $n_{II}$. By means of the contacts $h^1_{II}$ one of which being provided for each brush, the brushes $b_I$ are shifted to other plugging spots and therewith, according to the plugging to other magnets D of the printing mechanism. Moreover, shifting of the group control relays G to other brushes $b_I$ is effected, namely to those brushes which analyze the group number in the summary card. If the operating cycle is finished the cam contact $n_{II}$ opens temporarily, said contact interrupting the holding circuit through relay $H^1$ so that the latter will be deenergized, thus causing its contacts $h^1_I$ and $h^1_{II}$ to return to their home position.

In the following operating cycle the summary card passes the brushes $b_{II}$. If the cam contact $n_{IV}$ closes in this operating cycle an impulse will flow through the brush $sb_{II}$ having passed a summary hole and through the contact $h^2_I$ through relay $H^2$. The latter responds and shifts its contacts $h^2_I$, $h^2_{II}$ and $h^2_{III}$. By means of contact $h^2_{II}$ the relay $H^2$ and establishes a holding circuit through the cam contact $n_{II}$. By means of the contacts $h^2_{II}$, one of which being provided for each group control relay, the group control relays G are shifted to other analyzing brushes $b_{II}$, namely to those brushes which in this operating cycle analyze the group number of the summary card. The contact $h^2_{III}$ disconnects the current circuit through the contacts $g_{III}$ and connects it through the contacts $g_{IV}$. In this way it is attained that in this operating cycle the group control indicates a change of the group numbers as a correct card sequence and that in case of identical group numbers it renders the machine stationary for error indication. In all other operating cycles, however, the contact $h^2_{III}$ is in its upper position since in these operating cycles the relay $H^2$ has not responded, and thereby the contacts $g_{III}$ are included in the current circuit. For these operating cycles the group control indicates a correct card sequence if the group numbers are identical. If in this position of the contact $h^2_{III}$ there is a change of the group number the current circuit to the motor M is interrupted upon opening of the cam contact $n_I$ so that the machine becomes stationary for error indication.

For reasons of clarity a printing mechanism shall briefly be described to which the inventive idea may for instance be applied.

Fig. 3 shows in section a printing place of the printing mechanism of the known Hollerith machines. Since this mechanism is described in numerous patents it is sufficient to repeat the operation only briefly: The crank disk 24 is driven by means of the shaft 23 which disk raises over a linkage a frame, synchronously with the passage of the hole positions of the card under the brushes. To the frame type bars are linked which can follow the movement of the frame under the influence of springs 25. The movement may, however, be stopped by the energization of the magnets D, the latter releasing a pawl 27 which drops into the teeth of the type bar. At the moment when the associated hole position is passing the brush the corresponding type will be in printing position. If a position is perforated the magnet is energized so that its pawl 27 will arrest the type bar in the corresponding position. At the end of the stroke typing is effected by the hammer 28, the types being then pressed against the paper feed roller 12. Subsequently the whole type basket will be restored to home position.

I claim:

1. In an index mark controlled machine, in combination, a group control mechanism including analyzers for the index marks in the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the group designation fields of the regular cards, means responsive to said special index mark, and means controlled by said special index mark responsive means to connect the analyzers for the group designation field of said special card to said group control mechanism during the analysis of the group designation field of said special card.

2. In an index mark card controlled machine, in combination, a group control mechanism including two analyzers for two subsequent cards, said two analyzers jointly controlling said group control mechanism and analyzing the index marks in the group designation fields of said cards at two comparing stations, said cards consisting of regular cards having the group designation field on a predetermined place thereon and of interspersed special cards having the group designation field on a different predetermined place thereon and being identified by a special index mark, said group control mechanism being normally under the joint control of the analyzers for the group designation fields of two subsequent cards, means responsive to said special index mark, and means controlled by said special index mark responsive means to connect the analyzers for the group designation field of said special card to said group control mechanism always at that comparing station at which the special card is analyzed.

3. An apparatus as claimed in claim 2 wherein said special index mark responsive means comprise a single special analyzer for the special index mark, said single special analyzer being associated with the first comparing station on which the consecutive cards arrive, and storing means controlled by said single special analyzer for storing upon detection of a special index mark the result of the analysis through two operation cycles each cycle corresponding to the passage of a card on a comparing station.

4. An apparatus as claimed in claim 2 wherein said special index mark responsive means comprise a special analyzer for the special index mark at each of said two comparing stations, each special analyzer controlling for its associated comparing station the connection of the analyzers for the group designation field of a special card to the group control mechanism.

5. In an index mark card controlled machine, in combination, a group control mechanism including analyzers for the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the group designation fields of the regular cards, analyzing means responsive to said special index mark, means controlled by said special index mark responsive analyzing means to connect the analyzers for the group designation field of said special card to said group control mechanism upon the analysis of the group designation field of the special card, and error indicating means under the joint control of said special index mark responsive analyzing means and the group control mechanism and movable to an error indicating position for indicating a deviation from a selected desirable sequence of said regular and special cards.

6. In an index mark card controlled machine, in combination, a group control mechanism including analyzers for the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the group designation fields of the regular cards, analyzing means responsive to said special index mark, and means controlled by said special index mark responsive analyzing means to connect the analyzers for the group designation field of said special card to said group control mechanism upon the analysis of the group designation field of the special card, and means under the joint control of said special index mark responsive analyzing means and the group control mechanism for stopping the operation of the machine when the sequence of said regular and special cards deviates from a desired selected sequence.

7. In an index mark card controlled machine, in combination, a group control mechanism including analyzers for the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the group designation fields of the regular cards, analyzing means responsive to said special index mark, and means controlled by said special index mark responsive analyzing means to connect the analyzers for the group designation field of said special card to said group control mechanism upon the analysis of the group designation field of the special card, and error indicating means under the joint control of said special index mark responsive analyzing means and the group control mechanism and movable between a no-error indicating position and an error indicating position for indicating a deviation from a desirable sequence of cards in which the group designation of the special card agrees with the group designation of the card preceding said special card.

8. In an index mark card controlled machine, in combination, a group control mechanism including analyzers for the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the group designation fields of the regular cards, analyzing means responsive to said special index mark, and means controlled by said special index mark responsive analyzing means to connect the analyzers for the group designation field of said special card to said group control mechanism upon the analysis of the group designation field of the special card, and error indicating means under the joint control of said special index mark responsive analyzing means and the group control mechanism and movable between a no-error indicating position and an error indicating position for indicating a deviation from a desirable sequence of cards in which the group designation of the special card agrees with the group designation of the card following said special card.

9. In an index mark card controlled machine, in combination, a group control mechanism including analyzers for the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the group designation fields of the regular cards, analyzing means responsive to said special index mark, and means controlled by said special index mark responsive analyzing means to connect the analyzers for the group designation field of said special card to said group control mechanism upon the analysis of the group designation field of the special card, and error indicating means under the joint control of said special index mark analyzing means and the group control mechanism and shiftale between an error indicating and a no-error indicating position, said error indicating means being shifted to said error indicating position when the analyzers of said group control mechanism sense a group change and at the same time the special index mark responsive analyzing means do not sense a special index mark in one of the cards between which a group change has occurred.

10. In an index mark card controlled machine, in combination, a group control mechanism including analyzers for the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the group designation fields of the regular cards, analyzing means responsive to said special index mark, means controlled by said special index mark responsive analyzing means to connect the analyzers for the group designation field of said special card to said group control mechanism upon the analysis of the group designation field of the special card, and indicating means under the joint control of said special index mark responsive analyzing means and the group control mechanism and shiftable between an error indicating or/and a no-error indicating position, said indicating means being shifted to said error indicating position when the special index mark responsive analyzing means sense a special index mark in each of two consecutive cards.

11. In an index mark card controlled machine, in combination, a group control mechanism including two analyzers for two subsequent cards, said two analyzers jointly controlling said group control mechanism and analyzing the index marks in the group designation fields of said cards at two comparing stations, said cards consisting of regular cards having the group designation field on a predetermined place thereon and of interspersed special cards having the group designation field on a different predetermined place thereon and being identified by a special index mark, said group control mechanism being normally under the joint control of the analyzers for the group designation fields of two subsequent cards, means responsive to said special index mark, and means controlled by said special index mark responsive means to connect the analyzers for the designation field of said special card to said group control mechanism always at that comparing station at which the special card is analyzed, error indicating means under the joint control of said special index mark responsive means and the group control mechanism, said special index mark responsive means causing at first group designation comparison at said two comparing stations between the regular card preceding the special card and the special card itself, and causing after advance of the special card to the other comparing station the designation comparison between the regular card following the special card and the special card itself.

12. In a machine as specified in claim 11, wherein said means controlled by said special index mark responsive means include storing means retaining the response to a special index mark through two analyzing cycles, each cycle corresponding to the analysis of a card on one of said comparing stations.

13. In a printing machine controlled by record cards having index marks, in combination, a printing mechanism controlled by analyzers for data fields of said record cards, a group control mechanism including analyzers for the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the designation fields of the regular cards, means responsive to said special index mark, and means controlled by said special index mark responsive means to connect the analyzers for the designation field of said special card to said group control mechanism upon the analysis of the group designation field of the special card, and means under the joint control of said special index mark responsive means and the group control mechanism for discontinuing the control of said printing mechanism by said record cards.

14. In a printing machine controlled by record cards having index marks, in combination, a printing mechanism controlled by analyzers for data fields of said record cards, a group control mechanism including analyzers for group designation fields of subsequent cards, said cards consisting of regular cards having the group designation field and data fields on predetermined places thereon and of interspersed special cards having the group designation field and the data fields on different predetermined places thereon and being identified by a special index mark, said group control mechanism being normally under the control of the group designation fields of the regular cards, means responsive to said special index mark, and means controlled by said special index mark responsive means to connect the analyzers for the designation field of said special card to said group control mechanism upon the analysis of the group designation field of the special card and for also connecting during analysis of said special card the analyzers for said differently placed data fields of the special card to the printing mechanism, and means under the joint control of said special index mark responsive means and the group control mechanism for discontinuing the control of said printing mechanism by said record cards.

15. In an index mark card controlled machine, in combination, a group control mechanism including analyzers for the group designation fields of subsequent cards, said cards consisting of regular cards having the group designation field on a predetermined place thereon and of interspersed special cards having the group designation field on a different predetermined place thereon and being identified by a special index mark, said group control mechanism being normally under the control of the designation fields of the regular cards, means responsive to said special index mark, means controlled by said special index mark responsive means to connect the analyzers for the designation field of said special card to said group control mechanism upon the analysis of the group designation field of the special card, indicating means under the joint control of said special index mark responsive means and the group control mechanism and shiftable between an error indicating a non-error indicating position, and manually settable means for moving said special index mark responsive means and said error indicating means to an inoperative position in which said last mentioned means are rendered ineffective.

16. In an index mark card controlled machine, in combination, a group control mechanism including analyzers for the index marks in the group designation fields of subsequent cards, said cards consisting of regular cards having the group designation field on a predetermined place thereon and of interspersed special cards having the group designation field on a different predetermined plate thereon, said regular and special cards differing from each other by a special mark, said group control mechanism being normally under the control of the group designation fields of the regular cards; means responsive to said special marks; and means controlled by said special marks responsive means to connect the analyzers for the group designation field of said special card to said group control mechanism during the analysis of the group designation field of said special card.

References Cited in the file of this patent

UNITED STATES PATENTS 2,624,459 Shafer ................ Jan. 6, 1953